US009112328B2

(12) United States Patent
Traynor et al.

(10) Patent No.: US 9,112,328 B2
(45) Date of Patent: Aug. 18, 2015

(54) OPTICAL SOURCE IMPLEMENTING A DOPED FIBER, FIBER FOR SUCH AN OPTICAL SOURCE AND METHOD FOR MANUFACTURING SUCH A FIBER

(75) Inventors: Nicholas Traynor, Bordeaux (FR); Johan Boullet, Bordeaux (FR); Eric Cormier, Cestas (FR); Ramatou Bello Doua, Begles (FR)

(73) Assignees: UNIVERSITE BORDEAUX 1, Talence (FR); ALPHANOV CENTRE TECHNOLOGIQUE OPTIQUE ET LASERS, Talence (FR)

( * ) Notice: Subject to any disclaimer, the term of this patent is extended or adjusted under 35 U.S.C. 154(b) by 76 days.

(21) Appl. No.: 13/505,560

(22) PCT Filed: Nov. 3, 2010

(86) PCT No.: PCT/FR2010/052354
§ 371 (c)(1),
(2), (4) Date: Jul. 30, 2012

(87) PCT Pub. No.: WO2011/055074
PCT Pub. Date: May 12, 2011

(65) Prior Publication Data
US 2012/0287498 A1    Nov. 15, 2012

(30) Foreign Application Priority Data
Nov. 3, 2009    (FR) ..................................... 09 05271

(51) Int. Cl.
*H01S 3/067*    (2006.01)
*H01S 3/23*    (2006.01)
(Continued)

(52) U.S. Cl.
CPC ........... *H01S 3/0672* (2013.01); *H01S 3/06729* (2013.01); *H01S 3/06754* (2013.01);
(Continued)

(58) Field of Classification Search
CPC .............. H01S 3/2303; H01S 3/06737; G02B 6/02366; G02B 6/03633
See application file for complete search history.

(56) References Cited

U.S. PATENT DOCUMENTS 4,315,666 A *   2/1982   Hicks, Jr. ........................ 385/30
4,829,529 A *   5/1989   Kafka ............................... 372/6
(Continued)

FOREIGN PATENT DOCUMENTS

GB          2366447 A       3/2002
WO      2005082801 A2       9/2005

OTHER PUBLICATIONS

Martin H. Muendel; "Optimal Inner Cladding Shapes for Double-clad Fiber Lasers"; Institute of Electrical and Electronics Engineers; CLEO '96; Conference on Lasers and Electro-Optics. Anaheim, Jun. 2-7, 1996; New York, IEEE, US; vol. 9, No. 9, Jan. 1, 1996, p. 209, XP000861756, ISBN:978-0-7803-3183-9.

*Primary Examiner* — Ari M Diacou
(74) *Attorney, Agent, or Firm* — Bachman & LaPointe, P.C.

(57) ABSTRACT

An optical source having a fiber emitting controlled single-transverse mode radiation at a wavelength of less than 1030 nm, includes at least one laser diode suitable for emitting a pumping wave; and a section of sheathed amplifying optical fiber having two ends, the amplifying optical fiber comprising a core and a pumping sheath, the fiber being doped with a rare earth dopant; a device for coupling the pumping source in the sheath of the doped fiber, characterized in that the core of the doped fiber includes a cylindrical portion doped with a rare earth element selected among ytterbium, neodymium, and thulium, in order to obtain a refractive index of the core that is higher than the refractive index of the sheath; the excitation wavelength of the laser diode is between 750 nm and 960 nm; the diameter of the sheath is greater than 50 microns, and the surface ratio of the doped core to the pumping sheath is between 8 and 50.

15 Claims, 7 Drawing Sheets

(51) Int. Cl.
*H01S 3/16* (2006.01)
*G02B 6/02* (2006.01)
*G02B 6/036* (2006.01)
*H01S 3/00* (2006.01)
*H01S 3/094* (2006.01)
*H01S 3/0941* (2006.01)
*H01S 3/117* (2006.01)

(52) U.S. Cl.
CPC ............ H01S3/1611 (2013.01); H01S 3/1616 (2013.01); H01S 3/1618 (2013.01); H01S 3/2308 (2013.01); *G02B 6/02366* (2013.01); *G02B 6/03627* (2013.01); *H01S 3/0064* (2013.01); *H01S 3/0092* (2013.01); *H01S 3/0675* (2013.01); *H01S 3/06712* (2013.01); *H01S 3/06737* (2013.01); *H01S 3/06741* (2013.01); *H01S 3/09408* (2013.01); *H01S 3/09415* (2013.01); *H01S 3/094007* (2013.01); *H01S 3/094011* (2013.01); *H01S 3/094015* (2013.01); *H01S 3/117* (2013.01)

(56) References Cited

U.S. PATENT DOCUMENTS

| | | | |
|---|---|---|---|
| 4,964,131 A * | 10/1990 | Liu et al. | 372/6 |
| 5,363,463 A * | 11/1994 | Kleinerman | 385/123 |
| 5,530,709 A * | 6/1996 | Waarts et al. | 372/6 |
| 5,539,758 A * | 7/1996 | Dennis | 372/6 |
| 5,594,747 A * | 1/1997 | Ball | 372/31 |
| 5,677,920 A * | 10/1997 | Waarts et al. | 372/6 |
| 5,710,786 A * | 1/1998 | Mackechnie et al. | 372/6 |
| 5,712,941 A * | 1/1998 | Imoto et al. | 385/126 |
| 5,847,863 A * | 12/1998 | Galvanauskas et al. | 359/341.3 |
| 5,867,304 A * | 2/1999 | Galvanauskas et al. | 359/333 |
| 6,151,338 A * | 11/2000 | Grubb et al. | 372/6 |
| 6,167,075 A * | 12/2000 | Craig et al. | 372/75 |
| 6,198,568 B1 * | 3/2001 | Galvanauskas et al. | 359/332 |
| 6,212,310 B1 * | 4/2001 | Waarts et al. | 385/24 |
| 6,288,835 B1 * | 9/2001 | Nilsson et al. | 359/341.3 |
| 6,301,271 B1 * | 10/2001 | Sanders et al. | 372/3 |
| 6,301,273 B1 * | 10/2001 | Sanders et al. | 372/6 |
| 6,445,494 B1 * | 9/2002 | Nilsson et al. | 359/341.1 |
| 6,477,295 B1 * | 11/2002 | Lang et al. | 385/31 |
| 6,480,659 B1 * | 11/2002 | Patlakh et al. | 385/125 |
| 6,510,276 B1 * | 1/2003 | Jain et al. | 385/142 |
| 6,751,241 B2 * | 6/2004 | Davis et al. | 372/6 |
| 6,987,783 B2 * | 1/2006 | Fajardo et al. | 372/6 |
| 7,006,751 B2 * | 2/2006 | Provost et al. | 385/141 |
| 7,046,432 B2 * | 5/2006 | Starodoumov | 359/341.32 |
| 7,190,705 B2 * | 3/2007 | Fermann et al. | 372/18 |
| 7,308,178 B2 * | 12/2007 | Bourova et al. | 385/127 |
| 7,508,853 B2 * | 3/2009 | Harter et al. | 372/30 |
| 7,526,167 B1 * | 4/2009 | Minelly | 385/126 |
| 8,204,349 B2 * | 6/2012 | Gapontsev et al. | 385/127 |
| 8,270,445 B2 * | 9/2012 | Morasse et al. | 372/40 |
| 8,363,313 B2 * | 1/2013 | Nakaguma et al. | 359/341.5 |
| 8,488,235 B2 * | 7/2013 | Rothenberg | 359/349 |
| 8,520,299 B2 * | 8/2013 | Digiovanni et al. | 359/341.3 |
| 2002/0030881 A1 * | 3/2002 | Nilsson et al. | 359/341.1 |
| 2002/0181512 A1 * | 12/2002 | Wang et al. | 372/6 |
| 2003/0021302 A1 * | 1/2003 | Grudinin et al. | 372/6 |
| 2003/0035639 A1 * | 2/2003 | Okuno | 385/124 |
| 2003/0063629 A1 * | 4/2003 | Davis et al. | 372/6 |
| 2004/0190119 A1 * | 9/2004 | Tauser et al. | 359/333 |
| 2004/0213302 A1 * | 10/2004 | Fermann et al. | 372/6 |
| 2005/0024716 A1 * | 2/2005 | Nilsson et al. | 359/341.31 |
| 2005/0163449 A1 * | 7/2005 | Provost et al. | 385/141 |
| 2005/0280887 A1 * | 12/2005 | Betin et al. | 359/333 |
| 2006/0120418 A1 * | 6/2006 | Harter et al. | 372/30 |
| 2006/0263024 A1 * | 11/2006 | Dong et al. | 385/125 |
| 2007/0104436 A1 * | 5/2007 | Li et al. | 385/125 |
| 2007/0237191 A1 * | 10/2007 | Kafka et al. | 372/20 |
| 2009/0103874 A1 * | 4/2009 | Broeng et al. | 385/126 |
| 2009/0201953 A1 * | 8/2009 | Peyghambarian et al. | 372/6 |
| 2009/0245303 A1 * | 10/2009 | Shimotsu | 372/27 |
| 2009/0262416 A1 * | 10/2009 | Lancaster et al. | 359/341.1 |
| 2010/0061415 A1 * | 3/2010 | Mattsson | 372/40 |
| 2010/0322575 A1 * | 12/2010 | Dong et al. | 385/123 |
| 2011/0064095 A1 * | 3/2011 | Gapontsev et al. | 372/6 |
| 2011/0097049 A1 * | 4/2011 | Gapontsev et al. | 385/127 |

* cited by examiner

OPTICAL SOURCE IMPLEMENTING A DOPED FIBER, FIBER FOR SUCH AN OPTICAL SOURCE AND METHOD FOR MANUFACTURING SUCH A FIBER

The present invention relates to the field of optically active fibers for the optical amplification and the production of high power and high brightness fiber lasers or high power and high brightness fiber amplifiers at wavelengths between 780 nm and 1030 nm and preferably lower than 1010 nm.

TECHNICAL FIELD OF THE INVENTION

The present invention relates more particularly to the field of optical fibers doped with rare earth elements such as ytterbium, neodymium or thulium, and optical lasers and amplifiers using such fibers to produce laser radiation.

A coherent power source produced with an ytterbium-doped fiber around 976 nm is also suitable for producing high power sources around 488 nm by frequency doubling in a nonlinear crystal. These visible sources are very useful for applications in biology such as flux cytometry or DNA sequencing.

Ytterbium-doped fiber lasers emitting around 976 nm, for example, have many applications in the telecommunications field, for pumping amplifiers and lasers based on ytterbium-doped crystals or fibers, and in the medical field.

Materials doped by ytterbium ions have a very large effective emission cross section around 976 nm. They are suitable for producing a source at 488 nm by frequency doubling.

The characteristics of ytterbium-doped optical fibers are in particular high spectral contrast, a transverse single-mode beam of very high average power (above 5 W) and, depending on the embodiment: spectral purity, perfectly defined polarization, noiseless continuous mode. Depending on the embodiments, these lasers may be frequency-doubled and produce blue radiation at 488 nm with average powers ranging from 1 W to over 15 W in continuous or pulsed mode.

PRIOR ART

The articles by Yllä Jarkko et al "A 3.5 W 977 nm jacketed air clad fiber laser ytterbium doped fiber laser" (OSA Trends in Optics and Photonics, Advanced Solid State Lasers Vol. 34, 2000) and Boullet et al, (Optics Express, Vol. 16, No. 22, p. 17891, 2008) teach the production of continuous single-mode radiation at 977 nm of 3.5 W in flexible fiber and of 94 W in rigid fiber.

The use of a class of fibers referred to as double-clad fibers is also known for the production of optical sources combining high average power and high brightness. These fibers consist of a central guide formed by a core doped with rare earth ions (for example Er, ytterbium, Nd, Tm, Ho, Pr, Sm) surrounded by a second larger-diameter guide. The outer guide, generally having a high numerical aperture, is suitable for injecting a high power beam issuing from a multi-mode laser diode.

This pump light is absorbed by the doped core during its propagation in the outer guide. The core, having a lower diameter and a lower numerical aperture, allows an emission (at the wavelength defined by the emission spectrum of the rare earth element) in an optical mode close to the diffraction limit. These lasers are sometimes called brightness converters.

Laser diodes are capable of delivering powers of several kW at 976 nm. However, the brightness is severely limited by the large emission surface area and the need to shape the beams issuing from the various emitters of the diode stack. It is possible to obtain good spatial quality of these laser diodes (reference is made to transverse single-mode emission, in which the emitted beam is at the diffraction limit), but the maximum power currently produced ranges from a few hundred mW to a few watts with the use of special structures.

Zenteno et al (electronics letters, vol. 37, no. 13, p. 819, 2001) used 1 W emission in a beam at the diffraction limit at 978 nm. The fiber used had an elliptical shape in order to facilitate the coupling of a laser diode with a rectangular emission surface. The power in this case was limited by the small size of the double-clad fiber (32 µm×16 µm).

The article by Yllä Jarkko et al ("A 3.5 W 977 nm jacketed air clad fiber laser ytterbium doped fiber laser", OSA Trends in Optics and Photonics, Advanced Solid State Lasers Vol. 34, 2000) teaches a circular-geometry fiber with a core and a small-diameter clad for producing several watts in a single-mode beam.

U.S. Pat. No. 6,751,241 also teaches an optically active fiber for producing a fiber laser or a fiber amplifier consisting of:

a core doped with optically excitable ions of ytterbium type having a three-level transition approaching 980 nm and having a core refractive index;

an inner clad surrounding the core and having a refractive index lower than the refractive index of the core, and a cross-sectional area between 2 and 8 times higher than the cross-sectional area of the core;

an outer clad surrounding the inner clad having a refractive index lower than the refractive index of the inner clad.

This prior art patent describes a core/clad surface ratio of between 2 and 25, and a major axis/minor axis ratio of a non-circular shape higher than 1.5:1. For a particular example described, in which the fiber is ytterbium-doped, the core/clad surface ratio is between 2 and 8.

The fiber described in this document has a clad whereof the shapes have been selected to facilitate the injection of a broad stripe diode with an elongated emission surface.

Also known is the article by Kangkang Chen et al ("100 W, fiberised, Linearly-Polarized, Picosecond Ytterbium Doped Fiber MOPA" Kangkang Chen, Shaif-ul Alam, Dejiao Lin, Andrew Malinowski and David J. Richardson, Optoelectronic Research Center, University of Southampton, Southampton SO17 1BJ, UK) which describes a MOPA picosecond fiber which delivers 20 ps pulses at a frequency of 970 MHz and at an average power of 100 W.

The solutions of the prior art do not allow the production of flexible fiber sources at 976 nm for continuous powers higher than 3.5 W or, in the case of pulsed sources, for powers higher than 1 W. Rigid fibers serve to produce powers up to 100 W but suffer from problems of compactness, spectral fineness, and polarization. Moreover, the lasers using doped fibers of the prior art do not allow satisfactory control of the spectral purity of the pulses or of the polarization.

In particular, the technical problem posed by the prior art solutions is that the transverse geometry of the doped fibers used in the prior art gives rise to an ion absorption probability that is substantially identical or even lower than the re-emission probability, for an amplification around 976 nm. These prior art solutions therefore do not allow the production of a stable emission at wavelengths lower than 1030 nm, and particularly lower than 1010 nm.

SUMMARY OF THE INVENTION

In order to remedy these drawbacks, the invention relates to an optical source having a fiber emitting controlled transverse single-mode radiation at a wavelength lower than 1030 nm, comprising:

at least one laser diode suitable for emitting a pumping wave, and a section of clad amplifying optical fiber having two ends, said amplifying optical fiber comprising a core and a pumping clad, the fiber being doped with a rare earth element, means for coupling said pumping source in the clad of said doped fiber, characterized in that the core of the doped fiber comprises a cylindrical portion doped with a rare earth element selected from ytterbium, neodymium, thulium, to obtain a core refractive index that is higher than that of the clad;

the excitation wavelength of said laser diode is between 750 nm and 960 nm; and the diameter of the clad is higher than 50 microns and the surface ratio of the doped core to the pumping clad is between 8 and 50.

Advantageously, the cross section of said clad has a major axis/minor axis ratio of between 1 and 1.4.

Preferably, the diameter of said clad is equal to or greater than 100 microns.

In a first preferred alternative, the emission wavelength is between 965 nm and 1010 nm, and the fiber is ytterbium-doped.

In a second alternative, the emission wavelength is between 880 nm and 960 nm, and the fiber is neodymium-doped.

In various embodiments:

the fiber comprises an outer clad and an inner clad, the refractive index of the transparent material of the outer clad being lower than that of the inner clad;

the clad of the fiber is a waveguide having a numerical aperture higher than 0.3 suitable for guiding the pumping wave, the waveguide being formed by a ring of air holes.

In a preferred embodiment, the fiber has an integrated spectral filtration, with a W profile.

In another alternative, the fiber is included in a pure silica rod to form a rigid element.

In a preferred implementation, the inventive device is operated in a MOPA (Master Oscillator Power Amplifier) configuration built around an amplified oscillator architecture, comprising:

a doped fiber constituting the amplifier, a source laser emitting in the spectral amplification bandwidth of said doped fiber, means for coupling said source laser in the doped core of said doped fiber, at at least one end of the fiber, a pumping source emitting in the spectral absorption bandwidth of the amplifying fiber, means for coupling said pumping source in the clad of said doped fiber, said amplifier comprising selective intra-cavity wavelength elements suitable for cooperating with the injection means, in order to filter on the given wavelength and also to re-inject into the fiber the pumping wave not absorbed after passage through the fiber.

In an advantageous alternative, said source laser is a semiconductor laser.

Preferably, the coupling means are related to a coupler comprising N multi-mode input fibers suitable for being welded directly to the fiber outputs of N pumping diodes and an output fiber suitable for being directly welded to the amplifying fiber.

In an alternative, said doped fiber constitutes an amplifying fiber, said source further comprising:

a pumping source emitting in the spectral absorption bandwidth of the amplifying fiber;

means for coupling said pumping source in the clad of said doped fiber;

an optical resonator suitable for re-injecting the laser beam issuing from the doped core of said fiber at the two ends of said amplifying fiber.

The resonator may be defined by selective mirrors, volume Bragg gratings or Bragg gratings photowritten in the core of the doped fiber or another geometrically compatible fiber.

In another advantageous embodiment, said doped fiber consists of a doped core surrounded by a tubular section having a refractive index lower than the index of the doped core and of the clad, the index varying radially from a maximum index at the center, to a minimum index at said tubular section, and an intermediate index in the clad.

Advantageously, said doped fiber is a polarization holding fiber.

In an advantageous embodiment, the doped fiber has a birefringence higher than $5 \times 10^{-5}$.

In an alternative, the doped fiber comprises a clad having longitudinal zones doped with a first type of dopant and longitudinal zones doped with a second type of dopant.

In another alternative, said doped fiber comprises a core carrying at least one Bragg grating written by photogravure, with a transmission spectrum determined to filter the emissions outside the desired spectral emission bandwidth.

In an alternative, the doped fiber is divided into two sections at least separated by at least one filter whereof the transmission spectrum is determined to filter the emissions outside the desired spectral emission bandwidth.

In another alternative, the doped fiber is divided into at least two sections, separated by at least one optical isolator limiting the interfering laser oscillations outside the desired emission bandwidth.

In a first implementation, the optical source emits in continuous mode.

In a second alternative, it emits in pulsed mode with pulse durations between 100 femtoseconds and one microsecond.

The invention also relates to a method for fabricating a doped fiber intended for a source, characterized in that a central element doped with a rare earth element is assembled in a preform for the formation of the fiber core, and at least six peripheral elements some doped with a first dopant, and some with a second dopant, surrounding said core, for the formation of the fiber clad.

Advantageously, some of said doped peripheral elements are boron and some are silica.

BRIEF DESCRIPTION OF THE DRAWINGS

The invention will be better understood from a reading of the description that follows, with reference to the appended drawings in which.

DETAILED DESCRIPTION OF THE PREFERRED EMBODIMENT(S)

Figure 1:
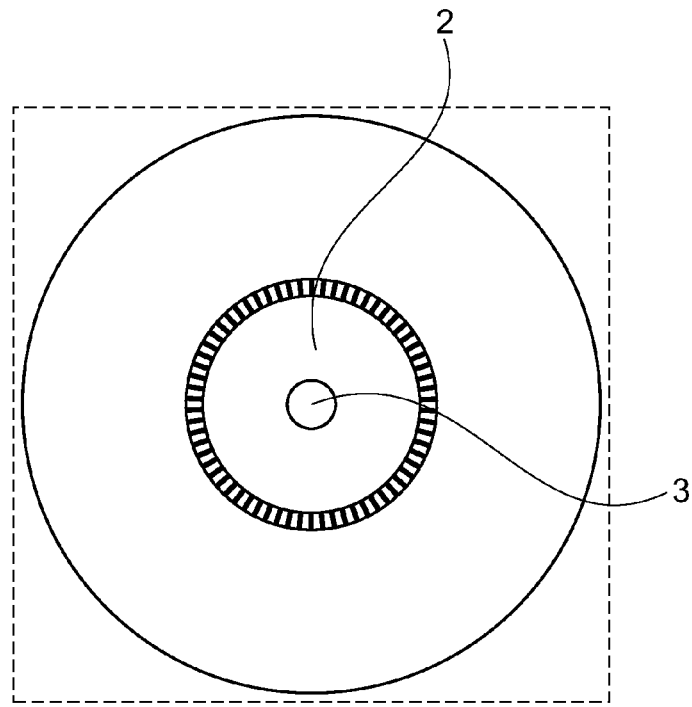
FIG. 1 shows a cross section of a fiber of the invention.

FIG. 1 shows a cross section of a fiber according to an embodiment of the invention. The fiber is an air-clad fiber with an outside diameter of 200 μm, a clad (2) diameter of 80 μm and a core (3) diameter of 20 μm. The core of the fiber consists of a cylindrical zone with a refractive index higher than that of the clad. This core is doped throughout its volume with the rare earth element Yb, and also with one or more co-dopants selected from P, Ce, Al, Ge. The multi-mode guide is defined by the air-clad.

In the ideal case, this fiber would have a core diameter of about 25 μm and a clad diameter of about 100 μm (clad/core surface ratio of 16). A core diameter between 10 and 30 μm is acceptable for the application. Preferably, the clad/core surface ratio of the fiber will be 8 and 25 for an effective laser operation at 976 nm. It appears that above a ratio of 50, the laser ray at 976 nm is difficult to observe.

The core (3), having a numerical aperture of 0.06, is slightly multi-mode at 976 nm. The surface area of the pumping clad is about 10 times greater than that described in the document by Yllä Jarkko et al, "A 3.5 W 977 nm jacketed air clad fiber laser ytterbium doped fiber laser", OSA Trends in Optics and Photonics, Advanced Solid State Lasers Vol. 34, 2000.

Figure 2:
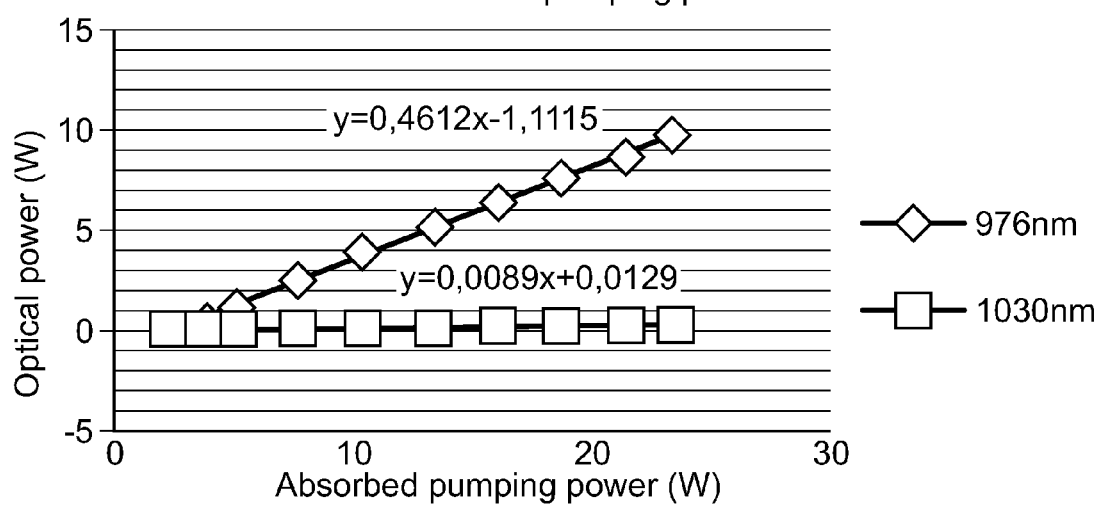
FIG. 2 shows the curve of spectral density as a function of the wavelength in the visible spectrum.

It allows the injection of several tens of watts of pumping. The laser performance at 976 nm (FIG. 2) shows an output power of 10 W at 976 nm and a very low level of ASE at 1030 nm. This power, which is only limited by the available pumping power, is three times higher than the previous record in a flexible fiber. The efficiency of the system (30%) is limited by the coupling ratio of the pump in the air-clad (the numerical aperture of the air-clad was 0.4, but a numerical aperture higher than 0.6 is feasible).

Considering the brightness level of present-day diodes, it is feasible to inject more than 100 W into such a fiber, yielding an output power higher than 50 W at 976 nm for a reasonable efficiency of 50%.

Such a fiber firstly allows an improvement of the spatial output quality.

The spatial quality of an optical mode is defined by the parameter M2, where M2=1 corresponds to a perfectly Gaussian mode at the diffraction limit. The output parameter M2 is measured for a laser of the invention is 1.17 for a fiber wound around a 210 mm diameter spindle. Despite the multi-mode character of the fiber, the laser naturally oscillates on the fundamental mode, assisted by the slight curvature which creates increased differential losses on higher order modes.

Such a fiber also serves to improve the spectral quality. A laser cavity defined by single mirrors does not have spectral selection. The laser emission then occurs in the form of a multitude of lines around the maximum gain at 976 nm (free running laser).

Figure 3:
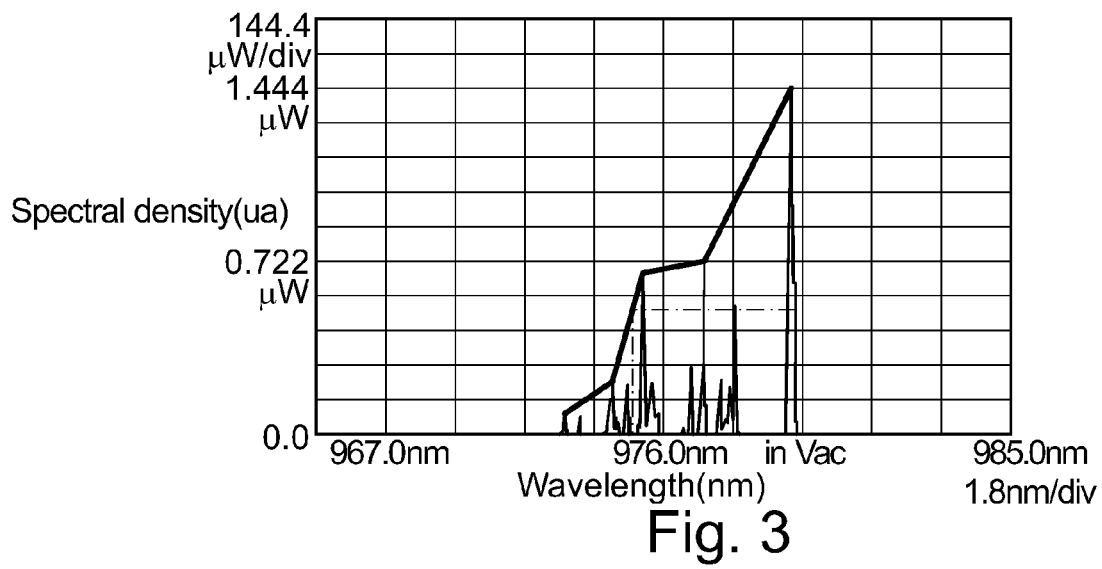
FIG. 3 shows the curve of spectral density as a function of the wavelength in a wavelength bandwidth of 975-980 nm.
Figure 4:
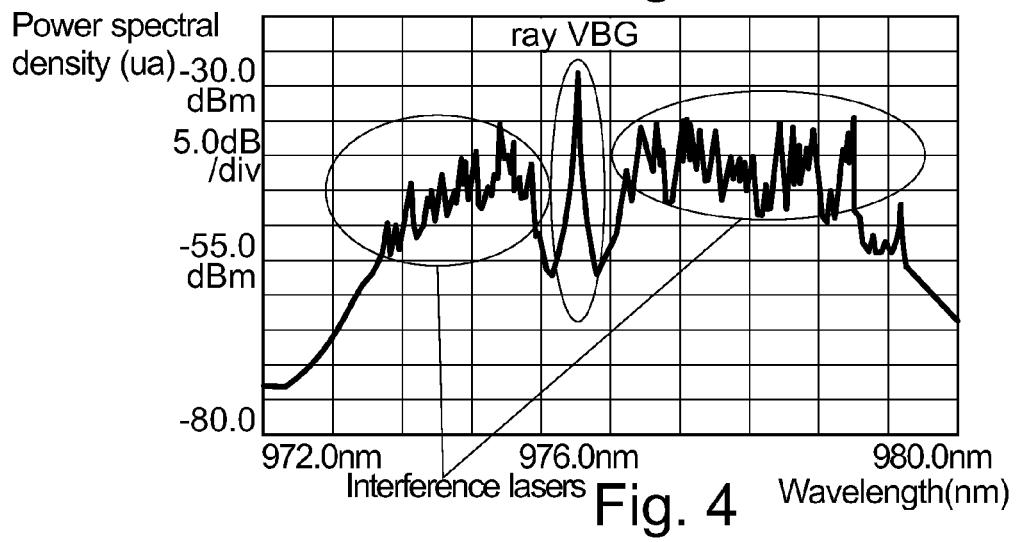
FIG. 4 shows the output spectrum of a laser system.

It is clear that the optical spectrum shown in FIG. 3 is not compatible with the spectral acceptance bandwidth of the PPLN type crystals required for the frequency doubling of continuous laser sources. To adapt the spectrum better to the doubling requirements, it is possible to use filter elements with a narrow spectral bandwidth, such as a VBG (volume Bragg grating) as an output coupler (FIG. 4).

Thus, it is possible to define a spectral line of about 100 pm, which is then compatible with the doubling in PPLN crystals of several tens of mm. However, the high gain that exists in the spectral bandwidth 975-980 nm may cause an interfering multi-line oscillation, caused by residual intra-cavity cavity reflections, or in secondary reflection peaks in the VBG.

Figure 5:
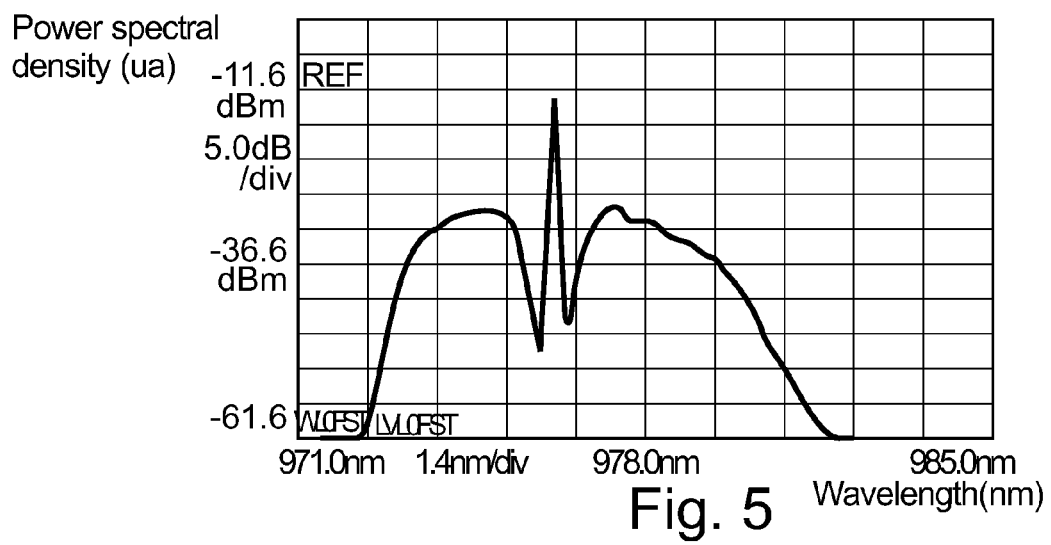
FIG. 5 shows the output spectrum of a MOPA system.

A reliable way is available for avoiding any interfering oscillation in the system. The operation of the system in a MOPA (Master Oscillator Power Amplifier) configuration enables us to define a system which minimizes each reflection. In this case, a relatively low power laser (Master Oscillator) is then amplified in a fiber amplification stage (Power Amplifier). The high gain of the fiber ensures a similar optical efficiency to a laser configuration. The major advantage of this system is the possibility of uncoupling the power and spectral quality requirements. A laser can be selected with characteristics compatible with the final application, which will be simply amplified by the fiber, while preserving these same characteristics. FIG. 5 shows the output spectrum of a MOPA system. The spectrum extinction rate is higher than 15 dB, which is a significant improvement of the extinction rate in comparison with the laser case (FIG. 4) measured at 7 dB.

If the "master" laser selected is spatially single-mode, it is possible to excite the fundamental mode more in the amplifying fiber, which may give the equivalent laser a higher spatial quality.

The "master" laser may be a fiber laser or a laser diode. Today, laser diodes are available with power, spectrum and polarization characteristics that are ideally suitable to this function:

Spatially single-mode and coupled in a fiber
Polarized
Power up to 400 mW ex fiber
Spectral bandwidth lower than 0.1 nm.

The direct amplification of such a laser in a double-clad fiber can yield powers higher than several hundred watts.

The master laser may also be a low power fiber laser (example <5 W). A plurality of amplification stages may be used to reach very high average powers.

Finally, the master laser may be a pulsed laser (femtosecond, picosecond or nanosecond). In this case, it is very often easier to define the temporal characteristics of the low power laser before amplifying the pulses in a power amplifier. We have found that in the case of a laser at 976 nm in Q-switched mode, it is preferable to construct a low power laser cavity in order to control:

the pulse duration;
the impact of the amplified spontaneous emission (ASE) which is constructed between each pulse emission;
the spectral purity of the pulses.

These well controlled pulses will then be amplified in an amplifying fiber, making it possible to reach very high average powers (5-100 W) while preserving their initial spectral, spatial and temporal qualities.

Figure 6:
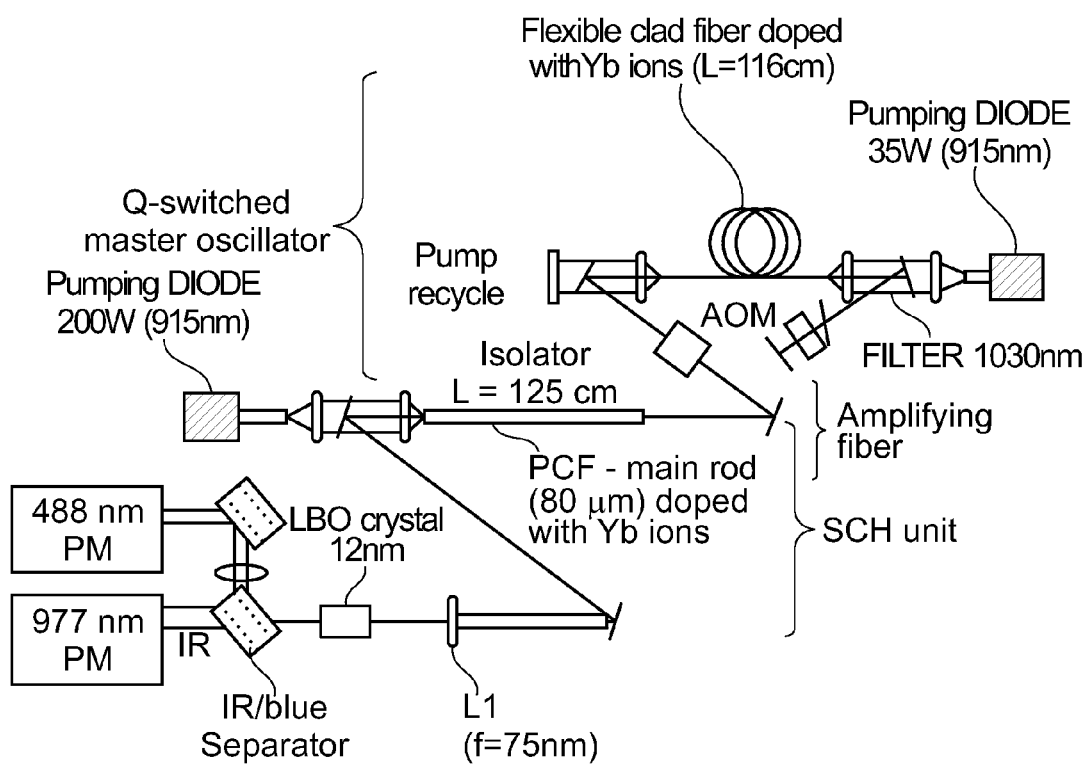
FIG. 6 shows a laser architecture of the invention.

In the configuration shown in FIG. 6, the laser device achieves advantageous performance in terms of pulse duration, energy, average power and peak power.

The pulses emitted by a Q-switched master oscillator are characterized by a duration of 12 ns for a repetition rate adjustable in a range of 10-400 kHz. The spectral bandwidth of the master source is fixed by an intra-cavity filter component (VBG) at 125 pm. The performance achieved with an exemplary embodiment is as follows:

Max average power: 78 W
Max energy: ~1 mJ
Max peak power >100 kW

After frequency doubling at 488 nm in a nonlinear crystal of LBO, it was demonstrated that a laser power emitted the blue of 16.1 W was obtained for an IR power of 44 W. Note that the previous record, dating from 2006, reported the emission of 83 mW in the blue (A. Bouchier, G. Lucas-Leclin, P. Georges, and J. Maillard, "Frequency doubling of an efficient continuous wave single-mode Yb-doped fiber laser at 978 nm in a periodically-poled MgO:LiNbO3 waveguide," Opt. Express 13, 6974-6979 (2005)).

This performance therefore constitutes a record in terms of single-mode radiation in the spectral bandwidths considered (IR and visible), both in terms of average power and in terms of energy per pulse.

Polarization Holding Fibers

The effectiveness of frequency doubling to obtain an emission in the blue (488 nm) is maximized if the radiation at 976 nm is entirely polarized. For this purpose, it is necessary for the amplifying fiber to ensure the holding of the polarization of the radiation. With the geometric limitations (low core/clad surface ratio), it is reasonable to consider how we can produce this function—a conventional polarization holding structure (PANDA fiber or bow-tie) would be impossible to use due to the limited space around the core.

Figure 7:
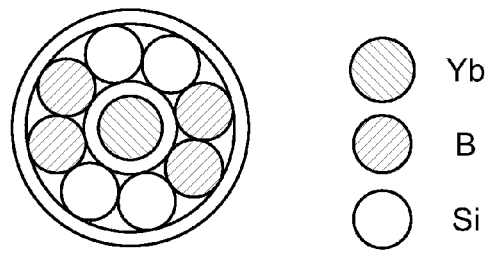
FIG. 7 shows a schematic view of the preparation of assembly of a plurality of elements in a preform before fiber drawing.

Many specific geometries are feasible:
- Elliptical-core fiber. A noncircular core has the property of being intrinsically birefringent, with the advantage of not imposing limitations on the clad dimensions. To define an elliptical core (or any other elongated shape) we set a length ratio between the major axis and the minor axis of at least 1.1:1;
- Fibers fabricated by assembling a plurality of elements in a preform before fiber drawing (FIG. 7).

This particular geometry serves to increase the volume of silica doped with boron (an element which imposes the mechanical limitation responsible for birefringence) by the use of several rods, without excessively increasing the clad diameter.

An ytterbium-doped central element (8) is introduced into the preform, surrounded by boron-doped elements (9) and neodymium-doped elements (10). In the example described, the elements are arranged radially, in adjacent pairs of elements with the same type of doping.

It is also possible, in some configurations, for this fiber to have a polarizing fiber function—in this case, instead of introducing a wide difference between the effective refractive indices of the two polarizations (polarization holding fiber), the winding of the fiber with a specific radius of curvature and aligned along the axis of the boron-doped elements can increase the propagation losses for one of the two polarization axes. This is particularly advantageous in laser mode where it is necessary to discriminate between the two polarization states in order to emit a polarized ray.

Figure 8:
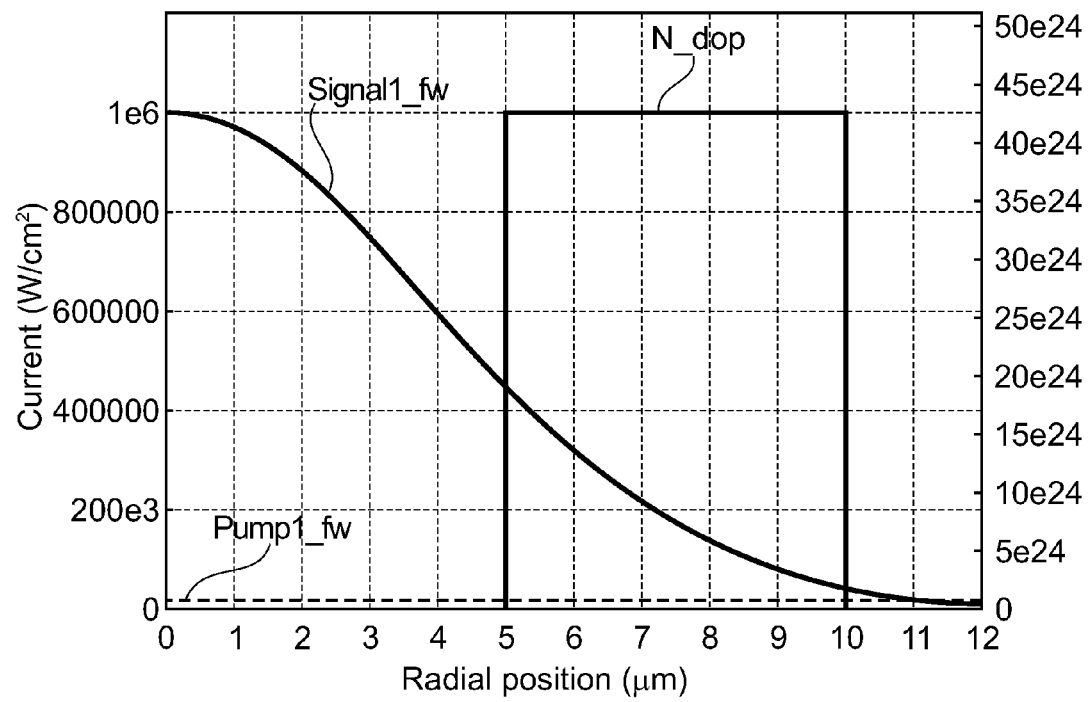
FIG. 8 shows the infrared fundamental mode distribution of a fiber of the invention.
Figure 9:
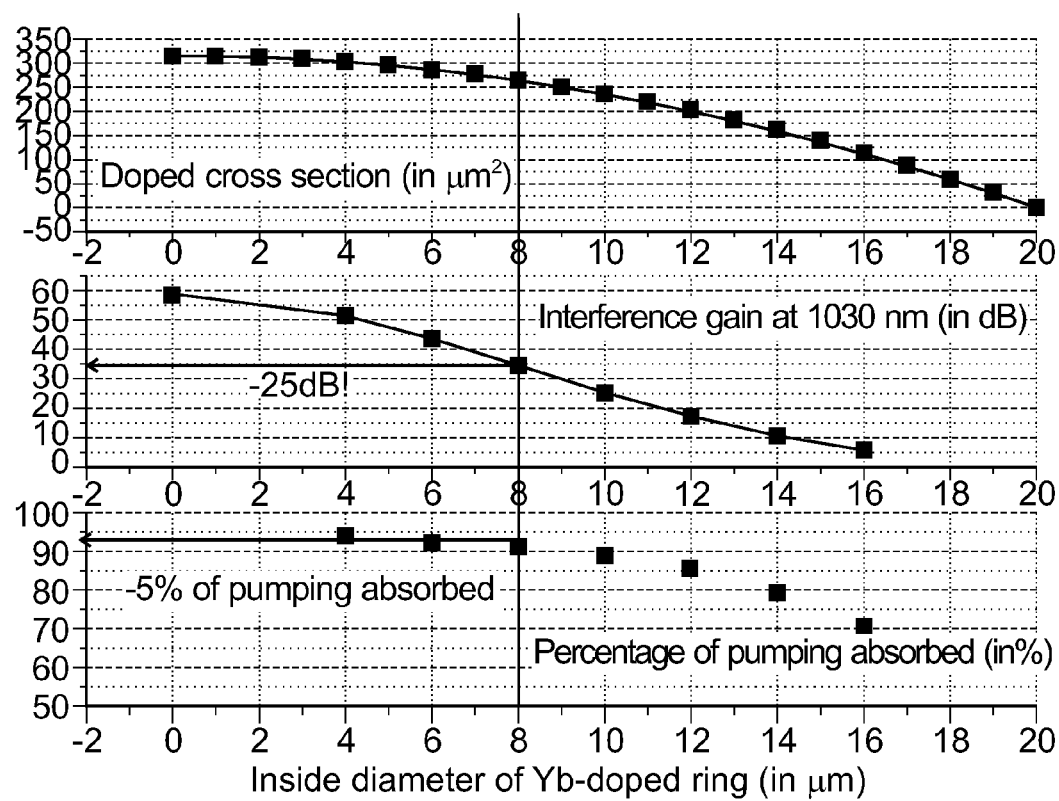
FIG. 9 shows the evolutions of the doped internal cross section, of the interference gain at 1030 nm, and of the absorbed pumping percentage as a function of the inside diameter of the ytterbium-doped ring.

Such a fiber shown in FIG. 8 has with a measured birefringence greater than $10^{-4}$.

Writing of Tilted Bragg Gratings

Tilted Bragg gratings can introduce losses during the propagation on one of the two polarization axes. These gratings can be used to convert a normal fiber to a polarization holding fiber and to convert a polarization holding fiber to a polarizing fiber. This involves the writing of a plurality of gratings along the entire length of the Yb-doped fiber. This device can also play a filtering role.

Filtering of the ASE Around 1030 nm

The laser cavities described are limited because they require severe filtering of the ASE around 1030 nm, and outside the doped fiber (filter element inserted in the cavity at the fiber output). Since external filtering is difficult to achieve above 60 dB, this requirement severely limits the length of the fiber (and the efficiency of the laser) for practical use. An elegant way to circumvent this limitation is to introduce means of filtering this interfering radiation along the entire amplifying fiber. This is feasible with many devices:

Amplifying Fiber with W Index Profile

The use of a "buried" clad around the doped core serves to introduce a wide variation of the effective index of the fundamental mode as a function of the wavelength.

In this case, a ring having a low refractive index (lower than that of the clad) is placed around the doped core—this ring usually consists of silica co-doped with fluorine.

For a certain radius of curvature of the fiber, we can introduce additional losses for the mode around 1030 nm without impacting the laser mode at 976 nm. This serves to relax the limitations on the length of the fiber because the gain at 1030 nm is offset by the guidance losses.

This fiber drawing geometry is obviously more complicated to implement and may impose a number of additional limitations on the geometry of the fiber. Other filtering methods are also feasible in the case in which these limitations are incompatible with the desired laser characteristics:

Writing of Bragg Gratings at Several Locations Along the Amplifying Fiber

Two types of Bragg grating exist which are capable of playing an ASE filtering role, LPG (long period gratings) and TFBG (tilted fiber Bragg gratings):

LPGs operate by the selective coupling of certain wavelengths toward the clad modes. The light is expelled from the single-mode core toward the clad where the light is co-propagating but only receives little optical gain thanks to its slight overlap with the doped core. It is possible to introduce losses higher than 10 dB over a spectral bandwidth of several tens of nanometers.

TFBGs have a similar action but the light expelled in the clad is generally back-reflecting. These gratings are also sensitive to polarization and, as mentioned above, could make the fiber polarizing for the signal wavelength. For interfering wavelengths, two gratings may be written to introduce losses for each polarization.

For the two types of grating, several writings can be made along the entire fiber in order to increase the interfering radiation rejection rate.

Operation with Two or More Amplification Stages

The filtering methods mentioned above require a specific architecture of the doped fiber or a modification of the fiber by the introduction of photowritten filters. A final feasible filtering method is available, which requires no modification of the doped fiber.

Figure 10:
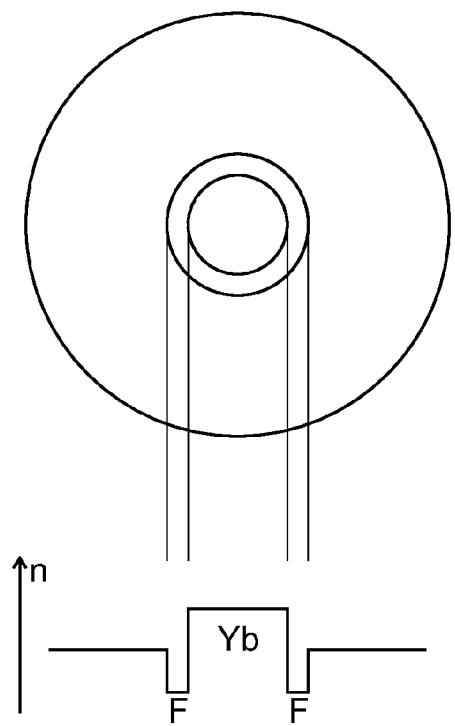
FIG. 10 shows a view of an amplifying fiber of the invention with a W index profile.
Figure 11:
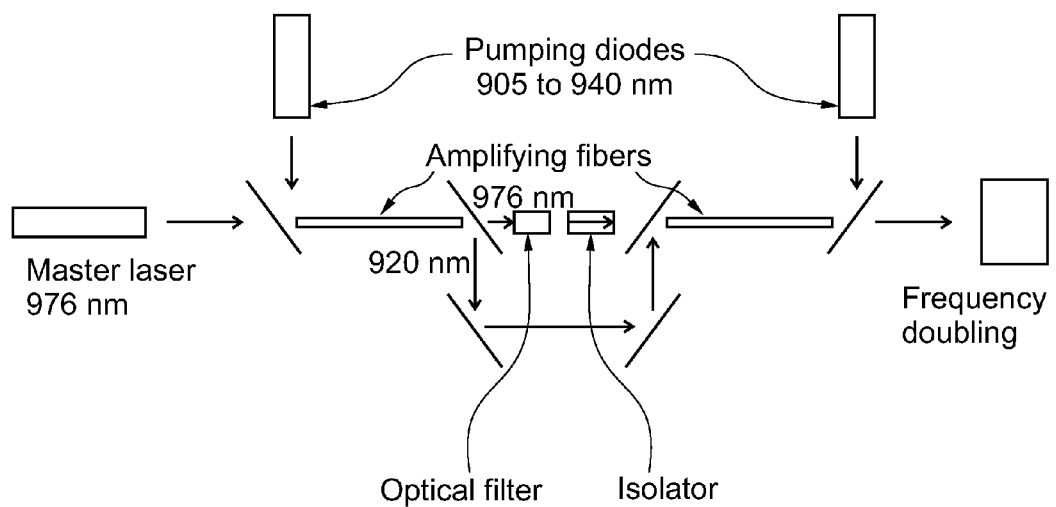
FIG. 11 shows a configuration for the MOPA case.

The configuration shown in FIG. 10 for the MOPA case is also valid for the laser case. This involves the separation of the amplifying fiber into two or more pieces associated with a recycling of the pump on each section. The signal produced by each section is injected into the next section (4 mirrors which define the light path at 920 nm, where at least the first is a dichroic mirror which separates the signal at 976 nm from the pump at 920 nm). The pump is re-injected into the next section in order to avoid reducing the overall efficiency. It is also feasible to have independent stages in which the pump of each stage is recycled into itself. Between each stage, the wave at 976 nm and the ASE at 1030 nm pass into an optical filter which allows the passage of the wave at 976 nm but which attenuates the ASE at 1030 nm. An optical isolator is also used (only in the MOPA case) to attenuate the ASE at 976 nm, which is counter-propagating and which may capture a significant portion of the laser power.

This configuration serves to use a total length of fiber that is greater with respect to a single-step configuration. It is also compatible with a fully integrated system where a multi-mode coupler is used in the reverse direction to separate the pump and the signal after the first step and a second coupler is used to combine the pump and the signal in the second amplification step.

Other Operating Modes

The concept of amplification at 976 nm in special fibers can also be applied in an ASE source configuration in which the system consists of a pumped amplifying fiber on the one hand, a spectral filtering system and a 100% mirror at 976 nm, and also a pump re-injection system. This source produces continuous radiation at 976 nm having a bandwidth of a few nm, non-polarized and spatially single-mode.

The MOPA architecture can also be varied to generate ultrashort pulses at 976 nm. In fact, the Master Oscillator can be operated in mode blocking condition to produce pulses in the time range 100 fs$^{-1}$ ps. These pulses are then amplified either directly in the fiber of the Power Amplifier or using the frequency drift amplification technique by stretching it temporally before amplification, before rephasing of the spectral components in a dispersive element having an opposite dispersion to the stretcher (compressor).

Figure 12:
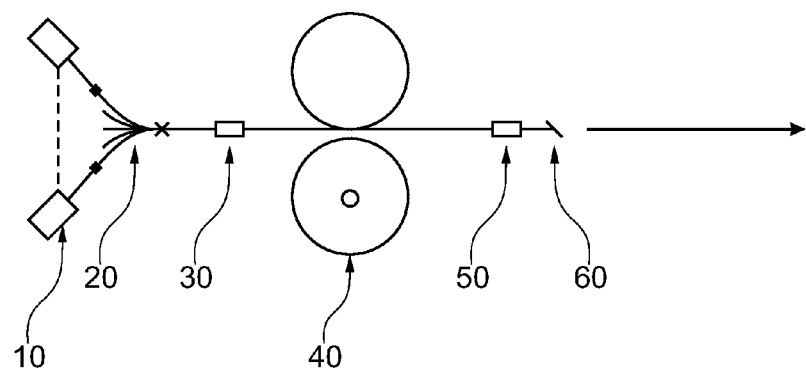
FIG. 12 shows a fully integrated high power fiber laser configuration at 977 nm according to another embodiment of the invention.

The invention also comprises fully integrated embodiments. In these embodiments, the integrated coupling can be applied to a laser configuration, shown in FIG. 12, or to a MOPA configuration, shown in FIG. 13. Thus, FIG. 12 shows an optical source of the invention which comprises:
  N multi-mode laser diodes 10 100/125 μm, ON=0.15;
  an all-fiber pumping coupler 20 N toward 1;
  a network of Bragg gratings 30 photowritten in the doped core of the amplifying fiber with maximum reflectivity (100%) at 977 nm;
  a double-clad fiber 40 microstructured 20/80 with an air-clad doped with ytterbium ions;
  a Bragg grating 50 photowritten in the doped core of the amplifying fiber having a reflectivity of 10% at 977 nm;
  an angle-polished high power SMA connector 60.

Thus, in this embodiment, the coupling means are related to a coupler comprising N multi-mode input fibers suitable for being welded directly to the fiber outputs of N pumping diodes and an output fiber suitable for being directly welded to the amplifying fiber.

Figure 13:
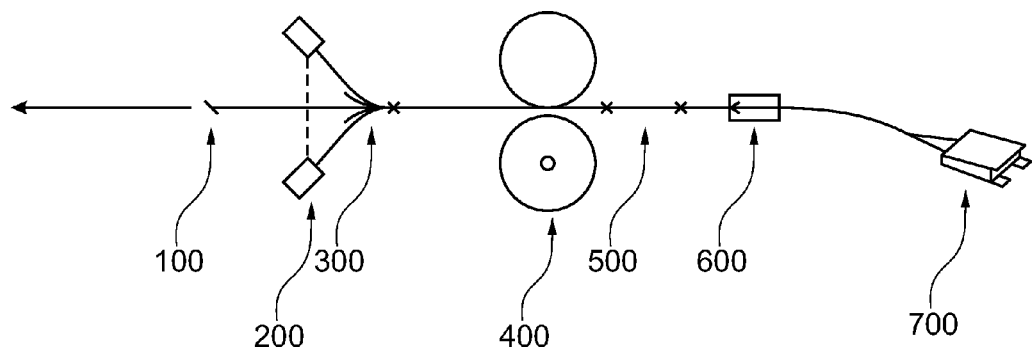
FIG. 13 shows a fully integrated high power MOPA configuration at 977 nm according to another embodiment of the invention.

Similarly, FIG. 13 shows an embodiment of the invention in a fully integrated high power MOPA configuration at 977 nm which comprises:
  an angle-polished high power SMA connector 100;
  N multi-mode laser diodes 200 (100/125 μm ON=0.15);
  an all-fiber pump combiner 300 provided with N multi-mode inputs and a single-mode signal output at 977 nm;
  a double-clad fiber 400 microstructured 20/80 with an air-clad doped with ytterbium ions;
  a clad mode suppressor 500 and a mode adapter; this adapter is preferably a mode adapter 20 toward 6;
  a fiber isolator 600 at 977 nm;
  a single-mode laser diode 700 having high spectral fineness at 977 nm.

The invention claimed is:

1. An optical source having a fiber emitting controlled transverse single-mode radiation at a wavelength lower than 1030 nm, comprising:
  at least one laser diode suitable for emitting a pumping wave, and
  a section of clad amplifying optical fiber having two ends, said clad amplifying optical fiber comprising a core and a pumping clad, the clad amplifying optical fiber being doped with a rare earth element,
  means for coupling a pumping source in the clad of said doped fiber,
  the core of the doped fiber comprising a cylindrical portion doped with a rare earth element selected from ytterbium, neodymium, and thulium, so as to obtain a core refractive index that is higher than that of the clad; and the excitation wavelength of said laser diode being between 750 nm and 960 nm; and
  a diameter of the inner clad is higher than 50 microns and a radius ratio of the pumping clad to the doped core is between 2.82 and 7.07.

2. The optical source as claimed in claim 1, wherein a cross section of said clad has a major axis/minor axis ratio between 1 and 1.4.

3. The optical source as claimed in claim 1, wherein an emission wavelength is between 965 nm and 1010 nm, and the fiber is ytterbium-doped.

4. The optical source as claim in claim 1, wherein an emission wavelength is between 880 nm and 960 nm, and the fiber is neodymium-doped.

5. The optical source as claimed in claim 1, wherein the fiber comprises an outer clad and an inner clad, a refractive index of a transparent material of the outer clad being lower than a refractive index of the inner clad.

6. The optical source as claimed in claim 1, wherein the clad of the fiber is a waveguide having a numerical aperture higher than 0.3 suitable for guiding the pumping wave, and a waveguide being formed by a ring of air holes.

7. The optical source as claimed in claim 1, wherein said optical source is operated in MOPA (Master Oscillator Power amplifier) configuration built around an amplified oscillator architecture, comprising:
  said doped fiber constituting the amplifier,
  a source laser emitting in a spectral amplification bandwidth of said doped fiber,
  means for coupling said source laser in the doped core of said doped fiber, at at least one end of the doped fiber,
  a pumping source emitting in a spectral absorption bandwidth of the amplifying fiber,
  means for coupling said pumping source in the clad of said doped fiber, and
  said amplifier comprising selective intra-cavity wavelength elements suitable for cooperating with the injection means, in order to filter on the given wavelength and also to re-inject into the fiber the pumping wave not absorbed after passage through the fiber.

8. The optical source as claimed in claim 7, in which the coupling means are related to a coupler comprising N multi-mode input fibers suitable for being welded directly to fiber outputs of N pumping diodes and an output fiber suitable for being directly welded to the amplifying fiber.

9. The optical source as claims in claim 1, wherein said doped fiber constitutes an amplifying fiber, said source further comprising:
- a pumping source emitting in a spectral absorption bandwidth of the amplifying fiber;
- means for coupling said pumping source in the clad of said doped fiber; and
- an optical resonator suitable for re-injecting a laser beam issuing from the doped core of said fiber at two ends of said amplifying fiber.

10. The optical source as claimed in claim 1, wherein said doped fiber consists of a doped core surrounded by a tubular section having a refractive index lower than the refractive index of the doped core and of the clad, the index varying radially from a maximum index at the center, to a minimum index at said tubular section, and an intermediate index in the clad.

11. The optical source as claimed in claim 1, wherein said doped fiber is a polarization holding fiber.

12. The optical source as claimed in claim 1, wherein said doped fiber comprises a clad having longitudinal zones doped with a first type of dopant and longitudinal zones doped with a second type of dopant.

13. The optical source as claimed in claim 1, wherein said doped fiber comprises a core carrying at least one Bragg grating written by photogravure, with a transmission spectrum configured to filter the emissions outside a desired spectral emission bandwidth.

14. The optical source as claim in claim 1, wherein the doped fiber is divided into two sections at least separated by at least one filter whereof a transmission spectrum determined to filter emissions outside a desired spectral emission bandwidth or by an optical isolator.

15. A method for fabricating a doped fiber intended for a source as claimed in claim 12, comprising the steps of assembling a central element doped with a rare earth element in a perform for the formation of the fiber core, and providing at least six peripheral elements including some peripheral elements doped with the first dopant, and some peripheral elements doped with a second dopant, and surrounding said fiber core with said peripheral elements for forming a fiber clad.

* * * * *